US008924656B1

(12) United States Patent
Usgaonkar et al.

(10) Patent No.: US 8,924,656 B1
(45) Date of Patent: Dec. 30, 2014

(54) STORAGE ENVIRONMENT WITH SYMMETRIC FRONTEND AND ASYMMETRIC BACKEND

(75) Inventors: Ameya Prakash Usgaonkar, Old Goa (IN); Parag Deshmukh, Bangalore (IN); Siddhartha Nandi, Bangalore (IN); Bipul Raj, Bangalore (IN)

(73) Assignee: NetApp, Inc., Sunnvale, CA (US)

( * ) Notice: Subject to any disclaimer, the term of this patent is extended or adjusted under 35 U.S.C. 154(b) by 316 days.

(21) Appl. No.: 13/456,654

(22) Filed: Apr. 26, 2012

(51) Int. Cl.
*G06F 12/00* (2006.01)

(52) U.S. Cl.
USPC .......................................... 711/152; 711/103

(58) Field of Classification Search
USPC .................................................. 711/103, 152
See application file for complete search history.

(56) References Cited

U.S. PATENT DOCUMENTS

| 6,336,175 | B1 * | 1/2002 | Shaath et al. | 711/163 |
| 7,165,129 | B1 * | 1/2007 | Okmianski et al. | 710/52 |
| 2008/0209136 | A1 * | 8/2008 | Qi et al. | 711/148 |
| 2010/0306488 | A1 * | 12/2010 | Stroberger | 711/162 |

OTHER PUBLICATIONS

"Fencing (computing)", Retrieved on Apr. 23, 2012, pp. 1-3, http://en.wikipedia.org/wiki/Fencing_%28computing%29.

* cited by examiner

*Primary Examiner* — Jared Rutz
*Assistant Examiner* — Christopher Do
(74) *Attorney, Agent, or Firm* — Cooper Legal Group, LLC

(57) ABSTRACT

One or more techniques and/or systems are provided for configuring a storage environment. In particular, the storage environment may be configured with a symmetric frontend and an asymmetric backend. That is, an owner storage controller may be granted read/write access to a storage device owned by the owner storage controller, while a non-owner storage controller may be granted merely read access. In this way, the owner storage controller may execute, log, and/or commit a write command to the storage device, while the non-owner storage controller may merely execute, but not log and/or commit, a write command. Write buffers, log memories, and/or file system metadata may be synchronized between the owner storage controller and the non-owner storage controller, such that the non-owner storage controller may efficiently take ownership of the storage device in response to a failure of the owner storage controller.

21 Claims, 9 Drawing Sheets

STORAGE ENVIRONMENT WITH SYMMETRIC FRONTEND AND ASYMMETRIC BACKEND

FIELD

The instant disclosure pertains to configuring a storage environment comprising one or more storage controllers with a symmetric frontend and an asymmetric backend.

BACKGROUND

A storage environment may comprise one or more storage controllers configured to provide storage functionality related to organization and accessibility of data stored on storage devices. In one example of providing accessibility, a storage controller may be configured to operate according to a client/server model, such that the storage controller may provide clients with access to data stored within storage devices associated with the storage controller. In one example of providing organization, a storage controller may be configured to create data structures (e.g., a virtual volume), replicate data, and/or perform other functionality associated with a storage device associated with the storage controller.

In one example of a conventional storage environment, one or more storage controllers may be configured to operate independent of one another. That is, a storage controller may be permitted access to storage devices owned by the storage controller, but may be denied access to storage devices not owned by the storage controller. For example, a first storage controller may be configured to provide storage functionality relating to a first storage device and a second storage device owned by the first storage controller. A second storage controller may be configured to provide storage functionality relating to a third storage device owned by the second storage controller. The first storage controller may not have permission to access the third storage device, and the second storage controller may not have permission to access the first and second storage devices. For example, the first storage controller may receive a write command associated with the third storage device from a client. Because the first storage controller may not have permission to access the third storage device, the first storage controller may forward the write command to the second storage controller for execution and/or commitment to the third storage device owned by the second storage controller.

The conventional storage environment may be configured to provide failure recovery for the one or more storage controllers. For example, responsive to the second storage controller failing, the first storage controller may initiate a takeover procedure of the third storage device. The first storage controller may restore an image of the failed second storage controller so that the first storage controller comprises updated information associated with the third storage device (e.g., updated information corresponding to dirty data of the failed second storage controller not yet committed to the third storage device). In this way, first storage controller may provide storage functionality associated with the third storage device previously owned by the failed second storage controller. Unfortunately, the takeover process (e.g., image restoration) may be time consuming, which may result in extended periods of unavailability for the third storage device.

SUMMARY

The disclosure relates to one or more techniques and/or systems for configuring a storage environment. The storage environment may comprise one or more storage controllers configured to provide storage functionality associated with storage devices (e.g., a storage controller may perform I/O operations on behalf of client computers, where the I/O operations are directed towards storage devices). It may be appreciated that in one example, an owner storage controller may be a storage controller that has full read/write access to data objects on the storage device, while a non-owner storage controller may be a storage controller that has full read access, but no write access, to data objects on the storage device. A storage controller may store data associated with a storage device within a write buffer (e.g., frequently and/or recently accessed data may be stored within an in-core buffer cache to improve performance by mitigating access to the storage device). For example, the storage controller may execute a write command to create dirty data within the write buffer (e.g., a dirty write buffer). It may be appreciated that in one example, dirty data may correspond to data within the write buffer that has been modified by a user I/O request and/or system I/O request, but has not yet been committed to the storage device (e.g., corresponding data within the storage device may be stale until the dirty data (within the buffer) is committed to the storage device). The storage controller may be configured to log the write command into a log memory (e.g., an NVRAM) for commitment to the storage device. The log memory may be utilized by the storage controller to identify and/or commit dirty data within the write buffer to the storage device. For example, the storage controller may commit dirty data within the write buffer to the storage device according the one or more logged write commands within the log memory.

In one example of configuring the storage environment, the storage environment may be configured with a symmetric frontend. That is, an owner storage controller and/or a non-owner storage controller may be exposed (e.g., to clients) as having read/write execution capabilities associated with a storage device owned by the owner storage controller. In this way, a client may send I/O requests for the storage device to the owner storage controller or the non-owner storage controller even though merely the owner storage controller owns the storage device. It may be appreciated that in one example, a frontend may correspond to an interface between clients and a storage controller, such as a client that initiates an I/O request, an intermediate transportation component that transports the I/O request, a protocol component on the storage controller (e.g., a SCSI target and/or an NFS target), etc.

The storage environment may be configured with an asymmetric backend. It may be appreciated that in one example, a backend may correspond to an interface (e.g., a file system, a RAID component, a physical storage device, etc.) between the storage controller and a storage device upon which data is physically stored. In one example of the asymmetric backend, the owner storage controller may be configured with read/write access to the storage device, while the non-owner storage controller may be configured with read access, but not write access, to the storage device. For example, the non-owner storage controller may be configured with permission to execute a write command into a non-owner write buffer to create dirty data. However, the non-owner storage controller may be denied permission to log the write command into a non-owner log memory (e.g., a local portion of the non-owner log memory) for commitment to the storage device. Instead, the non-owner storage controller may notify the owner storage controller to log and/or commit the executed write command to the storage device. In one example of providing notification, the non-owner storage controller may log the write command into a partner portion, but not the local portion, of the non-owner log memory for synchronization, such as reverse mirroring, with the owner storage controller. In contrast, the owner storage controller may be configured with permission to execute a write command into an owner write buffer, log the write command into an owner log memory, and/or commit the write command to the storage device.

In another example of configuring the storage environment, the owner storage controller may be configured to log and/or commit one or more write commands to the storage device according to an ordered write sequence. Because the symmetric frontend allows non-owner storage controllers to process I/O requests (e.g., execute, but not log and/or commit, a write command) for the storage device owned by the owner storage controller, an ordered write sequence according to which the owner storage controller may log and/or commit write commands may be created. For, example, the non-owner storage controller may execute a write command and the owner storage controller may execute a second write command. An ordered write sequence for the write command and the second write command may be created so that the owner storage controller may log and/or commit the write commands in a desired order. For example, timestamps specifying times at which the write commands were received may be compared to create the ordered write sequence (e.g., as opposed to an order with which write commands were logged, which may produce inconsistent results due to variations in processing times, for example). In this way, storage controllers may be aware of write commands executed by other storage controllers so that such write commands may be logged and/or committed in a desired order.

In another example of configuring the storage environment, file system metadata may be synchronized between the owner storage controller and the non-owner storage controller. That is, the owner storage controller may allocate a write location within the storage device for commitment of dirty data within the owner write buffer. The owner storage controller may commit the dirty data to the write location within the storage device, which may result in file system metadata (e.g., a virtual volume block number, a physical volume block number, an inode, and/or other information associated with the committed dirty data). The owner storage controller may be configured to send the file system metadata to the non-owner storage controller for synchronization. The non-owner storage controller may update a non-owner write buffer based upon the file system metadata. In this way, the non-owner storage controller may comprise updated information in the event the owner storage controller fails. In this way, responsive to a failure of the owner storage controller, the non-owner storage controller may efficiently take over ownership of the storage device based upon the updated non-owner write buffer (in the non-owner storage controller) (e.g., the non-owner storage controller may service I/O requests from clients from the point where the owner storage controller failed).

In another example of configuring the storage environment, log data may be reverse mirrored between a non-owner log memory of the non-owner storage controller and an owner log memory of the owner storage controller. The non-owner storage controller may be associated with the non-owner log memory comprising a local portion (e.g., used to commit logged write commands to a storage device owned by the non-owner storage controller) and/or a partner portion (e.g., used to synchronize write commands to the owner storage controller for commitment to a storage device owned by the owner storage controller). In one example, the non-owner storage controller may execute a write command associated with a storage device owned by the owner storage controller, but not owned by the non-owner storage controller. The non-owner storage controller may be denied permission to log the executed write command into the local portion of the non-owner log memory for commitment to the storage device. However, the non-owner storage controller may be granted permission to log the executed write command into the partner portion of the non-owner log memory for synchronization with the owner storage controller. In particular, the partner portion of the non-owner log memory may be mapped to a local portion of the owner log memory. The logged write command may be reverse mirrored from the partner portion of the non-owner log memory to the local portion of the owner log memory. In this way, the owner storage controller may become aware of the write command executed by the non-owner storage controller, and may commit the write command to the storage device.

Configuring the storage environment may allow the owner storage controller and the non-owner storage controller to share and/or synchronize information associated with write commands. Such synchronization may provide the non-owner storage controller with updated information associated with the owner storage controller and/or the storage device (e.g., updated information within a non-owner write buffer and/or a non-owner log memory), which may be used by the non-owner storage controller to efficiently (e.g., more quickly) take over ownership of the storage device responsive to a failure of the owner storage controller (e.g., without the non-owner storage controller having to restore an image of the owner storage controller to obtain such updated information, where such image restoration may result in noticeable interruptions in service and/or less swift or a protracted failover recovery, for example). In this way, the non-owner storage controller may provide clients with access to the storage device, while mitigating interruptions in service (e.g., which may have occurred from a lengthy takeover process where the non-owner storage controller did not comprise such updated information).

To the accomplishment of the foregoing and related ends, the following description and annexed drawings set forth certain illustrative aspects and implementations. These are indicative of but a few of the various ways in which one or more aspects may be employed. Other aspects, advantages, and novel features of the disclosure will become apparent from the following detailed description when considered in conjunction with the annexed drawings.

DETAILED DESCRIPTION

Figure 1:
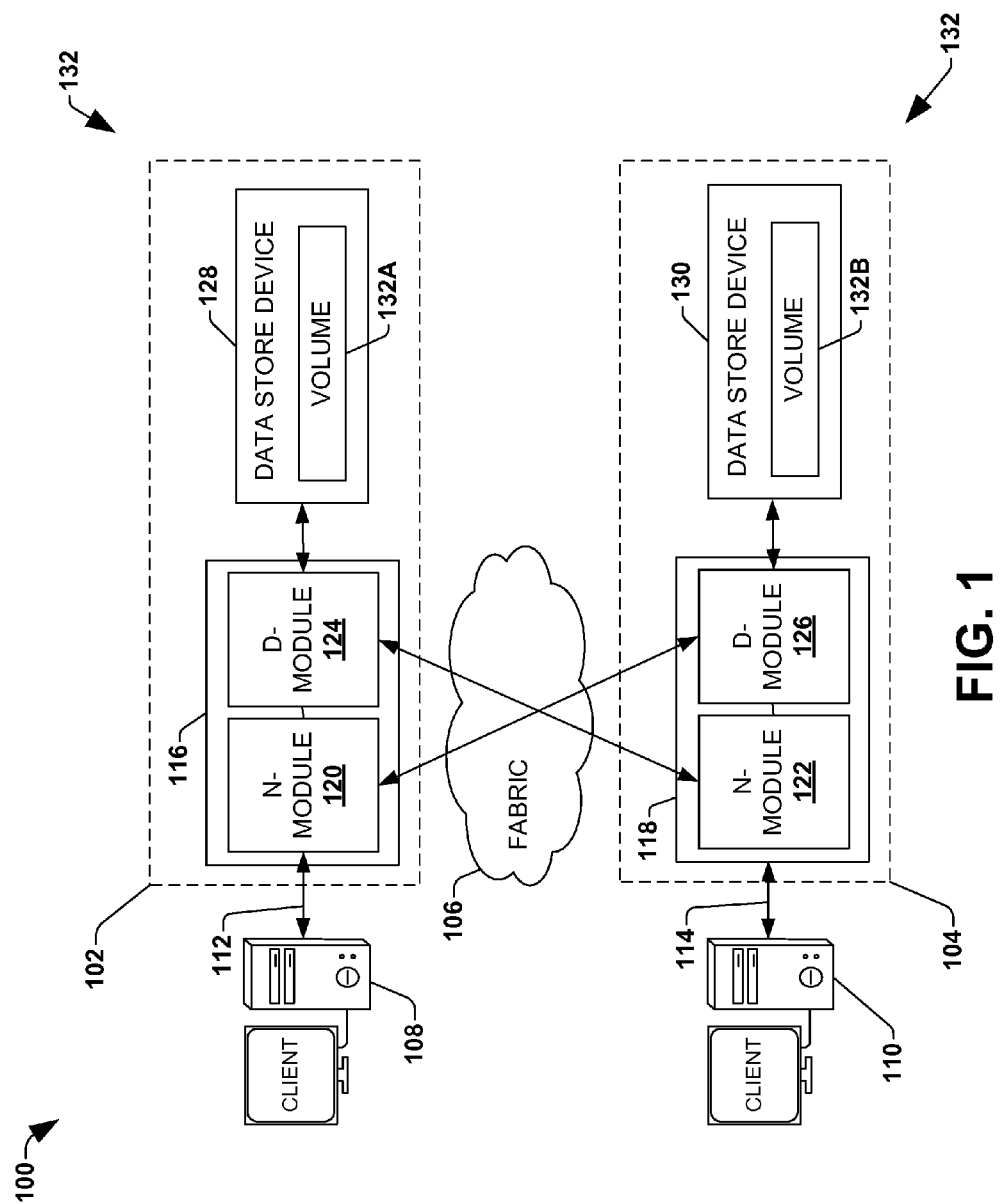
FIG. 1 is a component block diagram illustrating an example clustered network in accordance with one or more of the provisions set forth herein.

Some examples of the claimed subject matter are now described with reference to the drawings, where like reference numerals are generally used to refer to like elements throughout. In the following description, for purposes of explanation, numerous specific details are set forth in order to provide a thorough understanding of the claimed subject matter. It may be evident, however, that the claimed subject matter may be practiced without these specific details. Nothing in this detailed description is admitted as prior art.

A storage environment (e.g., a clustered network environment 100 of FIG. 1, a data storage system 200 of FIG. 2, etc.) may comprise one or more storage controllers (e.g., nodes 116, 118 of FIG. 1, node 202 of FIG. 2, etc.) configured to provide storage functionality associated with one or more storage devices (e.g., node 116 may be configured to provide client 108 with access to data storage device 128). In one example, the one or more storage controllers may be configured to operate independent of one another. For example, a first storage controller may be configured to access one or more storage devices owned by the first storage controller, but may be restricted from accessing storage devices that the first storage controller does not own. Due to the independent operation of storage controllers, a failure of a storage controller may result in data unavailable within a storage device owned by the failed storage controller until a second storage controller is able to complete a takeover procedure of the storage device (e.g., a client may be unable to access data stored within a storage device owned by the failed storage controller). For example, a non-owner storage controller may be configured to perform a time intensive takeover procedure of one or more storage devices owned by a failed owner storage controller. Because the failed owner storage controller may have comprised dirty data not yet committed to a storage device, the non-owner storage controller may load an image of the failed owner storage controller as part of the takeover procedure. Accordingly, it may be advantageous to synchronize information between storage controllers so that a storage controller may efficiently takeover for a failed storage controller using synchronized information (e.g., synchronized information within a write buffer and/or log memory, synchronized file system metadata, etc.).

Figure 2:
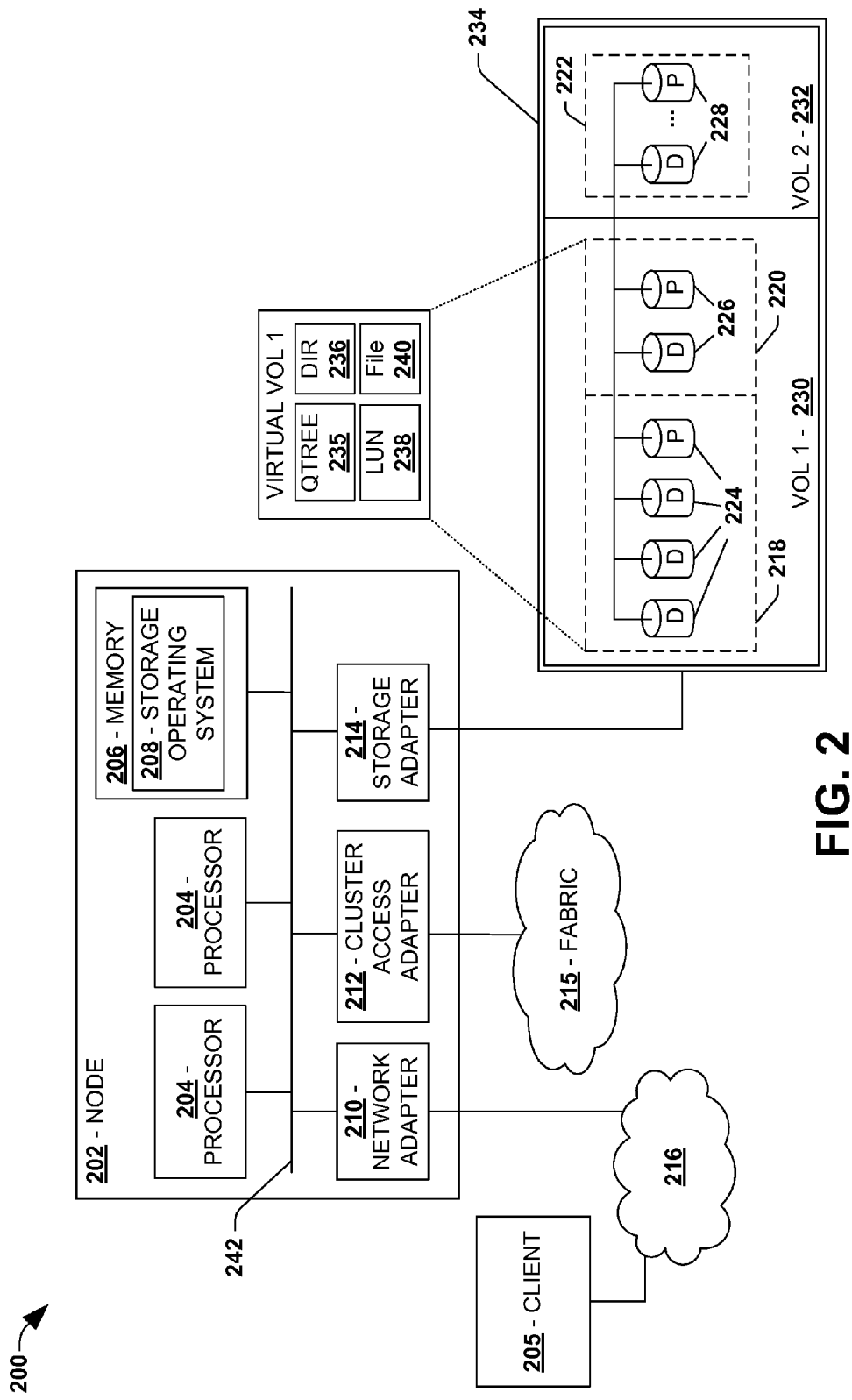
FIG. 2 is a component block diagram illustrating an example data storage system in accordance with one or more of the provisions set forth herein.

To provide context for configuring a storage environment, FIG. 1 illustrates an embodiment of a clustered network environment 100 (e.g., a storage environment), and FIG. 2 illustrates an embodiment of a data storage system 200 (e.g., a storage environment comprising one or more storage controllers). It may be appreciated, however, that the techniques, etc. described herein may be implemented within the clustered network environment 100, a non-cluster network environment, and/or a variety of other computing environments. That is, the instant disclosure, including the scope of the appended claims, is not meant to be limited to the examples provided herein. It will be appreciated that where the same or similar components, elements, features, items, modules, etc. are illustrated in later figures but were previously discussed with regard to prior figures, that a similar (e.g., redundant) discussion of the same may be omitted when describing the subsequent figures (e.g., for purposes of simplicity and ease of understanding).

FIG. 1 is a block diagram illustrating an example clustered network environment 100 that may implement at least some embodiments of the techniques and/or systems described herein. The example environment 100 comprises data storage systems 102 and 104 that are coupled over a cluster fabric 106, such as a computing network embodied as a private Infiniband or Fibre Channel (FC) network facilitating communication between the storage systems 102 and 104 (and one or more modules, component, etc. therein, such as, nodes 116 and 118, for example). It will be appreciated that while two data storage systems 102 and 104 and two nodes 116 and 118 are illustrated in FIG. 1, that any suitable number of such components is contemplated. Similarly, unless specifically provided otherwise herein, the same is true for other modules, elements, features, items, etc. referenced herein and/or illustrated in the accompanying drawings. That is, a particular number of components, modules, elements, features, items, etc. disclosed herein is not meant to be interpreted in a limiting manner.

It will be further appreciated that clustered networks are not limited to any particular geographic areas and can be clustered locally and/or remotely. Thus, in one embodiment a clustered network can be distributed over a plurality of storage systems and/or nodes located in a plurality of geographic locations; while in another embodiment a clustered network can include data storage systems (e.g., 102, 104) residing in a same geographic location (e.g., in a single onsite rack of data storage devices).

In the illustrated example, one or more clients 108, 110 which may comprise, for example, personal computers (PCs), computing devices used for storage (e.g., storage servers), and other computers or peripheral devices (e.g., printers), are coupled to the respective data storage systems 102, 104 by storage network connections 112, 114. Network connection may comprise a local area network (LAN) or wide area network (WAN), for example, that utilizes Network Attached Storage (NAS) protocols, such as a Common Internet File System (CIFS) protocol or a Network File System (NFS) protocol to exchange data packets. Illustratively, the clients 108, 110 may be general-purpose computers running applications, and may interact with the data storage systems 102, 104 using a client/server model for exchange of information. That is, the client may request data from the data storage system, and the data storage system may return results of the request to the client via one or more network connections 112, 114.

The nodes 116, 118 on clustered data storage systems 102, 104 can comprise network or host nodes that are interconnected as a cluster to provide data storage and management services, such as to an enterprise having remote locations, for example. Such a node in a data storage and management network cluster environment 100 can be a device attached to the network as a connection point, redistribution point or communication endpoint, for example. A node may be capable of sending, receiving, and/or forwarding information over a network communications channel, and could comprise any device that meets any or all of these criteria. One example of a node may be a data storage and management server attached to a network, where the server can comprise a general purpose computer or a computing device particularly configured to operate as a server in a data storage and management system.

As illustrated in the exemplary environment 100, nodes 116, 118 can comprise various functional components that coordinate to provide distributed storage architecture for the cluster. For example, the nodes can comprise a network module 120, 122 (e.g., N-Module, or N-Blade) and a data module 124, 126 (e.g., D-Module, or D-Blade). Network modules 120, 122 can be configured to allow the nodes 116, 118 to connect with clients 108, 110 over the network connections 112, 114, for example, allowing the clients 108, 110 to access data stored in the distributed storage system. Further, the network modules 120, 122 can provide connections with one or more other components through the cluster fabric 106. For example, in FIG. 1, a first network module 120 of first node 116 can access a second data storage device 130 by sending a request through a second data module 126 of a second node 118.

Data modules 124, 126 can be configured to connect one or more data storage devices 128, 130, such as disks or arrays of disks, flash memory, or some other form of data storage, to the nodes 116, 118. The nodes 116, 118 can be interconnected by the cluster fabric 106, for example, allowing respective nodes in the cluster to access data on data storage devices 128, 130 connected to different nodes in the cluster. Often, data modules 124, 126 communicate with the data storage devices 128, 130 according to a storage area network (SAN) protocol, such as Small Computer System Interface (SCSI) or Fiber Channel Protocol (FCP), for example. Thus, as seen from an operating system on a node 116, 118, the data storage devices 128, 130 can appear as locally attached to the operating system. In this manner, different nodes 116, 118, etc. may access data blocks through the operating system, rather than expressly requesting abstract files.

It should be appreciated that, while the example embodiment 100 illustrates an equal number of N and D modules, other embodiments may comprise a differing number of these modules. For example, there may be a plurality of N and/or D modules interconnected in a cluster that does not have a one-to-one correspondence between the N and D modules. That is, different nodes can have a different number of N and D modules, and the same node can have a different number of N modules than D modules.

Further, a client 108, 110 can be networked with the nodes 116, 118 in the cluster, over the networking connections 112, 114. As an example, respective clients 108, 110 that are networked to a cluster may request services (e.g., exchanging of information in the form of data packets) of a node 116, 118 in the cluster, and the node 116, 118 can return results of the requested services to the clients 108, 110. In one embodiment, the clients 108, 110 can exchange information with the network modules 120, 122 residing in the nodes (e.g., network hosts) 116, 118 in the data storage systems 102, 104.

In one embodiment, the data storage devices 128, 130 comprise volumes 132, which is an implementation of storage of information onto disk drives or disk arrays or other storage (e.g., flash) as a file-system for data, for example. Volumes can span a portion of a disk, a collection of disks, or portions of disks, for example, and typically define an overall logical arrangement of file storage on disk space in the storage system. In one embodiment a volume can comprise stored data as one or more files that reside in a hierarchical directory structure within the volume.

Volumes are typically configured in formats that may be associated with particular storage systems, and respective volume formats typically comprise features that provide functionality to the volumes, such as providing an ability for volumes to form clusters. For example, where a first storage system may utilize a first format for their volumes, a second storage system may utilize a second format for their volumes.

In the example environment 100, the clients 108, 110 can utilize the data storage systems 102, 104 to store and retrieve data from the volumes 132. In this embodiment, for example, the client 108 can send data packets to the N-module 120 in the node 116 within data storage system 102. The node 116 can forward the data to the data storage device 128 using the D-module 124, where the data storage device 128 comprises volume 132A. In this way, in this example, the client can access the storage volume 132A, to store and/or retrieve data, using the data storage system 102 connected by the network connection 112. Further, in this embodiment, the client 110 can exchange data with the N-module 122 in the host 118 within the data storage system 104 (e.g., which may be remote from the data storage system 102). The host 118 can forward the data to the data storage device 130 using the D-module 126, thereby accessing volume 132B associated with the data storage device 130.

It may be appreciated that a storage environment may be implemented within clustered network environment 100. For example, the storage environment may comprise storage devices 128, 130 and/or other storage devices not illustrated. Nodes 116, 118 may be implemented as storage controllers configured to store data and/or provide clients 108, 110 with access to data stored within the storage environment. For example, nodes 116 and 118 may comprise components configured to implement techniques for configuring the storage environment.

FIG. 2 is an illustrative example of a data storage system 200 (e.g., 102, 104 in FIG. 1), providing further detail of an embodiment of components that may implement one or more of the techniques and/or systems described herein. The example data storage system 200 comprises a node 202 (e.g., host nodes 116, 118 in FIG. 1), and a data storage device 234 (e.g., data storage devices 128, 130 in FIG. 1). The node 202 may be a general purpose computer, for example, or some other computing device particularly configured to operate as a storage server. A client 205 (e.g., 108, 110 in FIG. 1) can be connected to the node 202 over a network 216, for example, to provides access to files and/or other data stored on the data storage device 234.

The data storage device 234 can comprise mass storage devices, such as disks 224, 226, 228 of a disk array 218, 220, 222. It will be appreciated that the techniques and systems, described herein, are not limited by the example embodiment. For example, disks 224, 226, 228 may comprise any type of mass storage devices, including but not limited to magnetic disk drives, flash memory, and any other similar media adapted to store information, including, for example, data (D) and/or parity (P) information.

The node 202 comprises one or more processors 204, a memory 206, a network adapter 210, a cluster access adapter 212, and a storage adapter 214 interconnected by a system bus 242. The storage system 200 also includes an operating system 208 installed in the memory 206 of the node 202 that can, for example, implement a Redundant Array of Independent (or Inexpensive) Disks (RAID) optimization technique to optimize a reconstruction process of data of a failed disk in an array.

The operating system 208 can also manage communications for the data storage system, and communications between other data storage systems that may be in a clustered network, such as attached to a cluster fabric 215 (e.g., 106 in FIG. 1). Thus, the host 202 can to respond to client requests to manage data on the data storage device 200 (e.g., or additional clustered devices) in accordance with these client requests. The operating system 208 can often establish one or more file systems on the data storage system 200, where a file system can include software code and data structures that implement a persistent hierarchical namespace of files and directories, for example. As an example, when a new data storage device (not shown) is added to a clustered network system, the operating system 208 is informed where, in an existing directory tree, new files associated with the new data storage device are to be stored. This is often referred to as "mounting" a file system.

In the example data storage system 200, memory 206 can include storage locations that are addressable by the processors 204 and adapters 210, 212, 214 for storing related software program code and data structures. The processors 204 and adapters 210, 212, 214 may, for example, include processing elements and/or logic circuitry configured to execute the software code and manipulate the data structures. The operating system 208, portions of which are typically resident in the memory 206 and executed by the processing elements, functionally organizes the storage system by, among other things, invoking storage operations in support of a file service implemented by the storage system. It will be apparent to those skilled in the art that other processing and memory mechanisms, including various computer readable media, may be used for storing and/or executing program instructions pertaining to the techniques described herein. For example, the operating system can also utilize one or more control files (not shown) to aid in the provisioning of virtual machines.

The network adapter 210 includes the mechanical, electrical and signaling circuitry needed to connect the data storage system 200 to a client 205 over a computer network 216, which may comprise, among other things, a point-to-point connection or a shared medium, such as a local area network. The client 205 (e.g., 108, 110 of FIG. 1) may be a general-purpose computer configured to execute applications. As described above, the client 205 may interact with the data storage system 200 in accordance with a client/host model of information delivery.

The storage adapter 214 cooperates with the operating system 208 executing on the host 202 to access information requested by the client 205. The information may be stored on any type of attached array of writeable media such as magnetic disk drives, flash memory, and/or any other similar media adapted to store information. In the example data storage system 200, the information can be stored in data blocks on the disks 224, 226, 228. The storage adapter 214 can include input/output (I/O) interface circuitry that couples to the disks over an I/O interconnect arrangement, such as a storage area network (SAN) protocol (e.g., Small Computer System Interface (SCSI), iSCSI, hyperSCSI, Fiber Channel Protocol (FCP)). The information is retrieved by the storage adapter 214 and, if necessary, processed by the one or more processors 204 (or the storage adapter 214 itself) prior to being forwarded over the system bus 242 to the network adapter 210 (and/or the cluster access adapter 212 if sending to another node in the cluster) where the information is formatted into a data packet and returned to the client 205 over the network connection 216 (and/or returned to another node attached to the cluster over the cluster fabric 215).

In one embodiment, storage of information on arrays 218, 220, 222 can be implemented as one or more storage "volumes" 230, 232 that are comprised of a cluster of disks 224, 226, 228 defining an overall logical arrangement of disk space. The disks 224, 226, 228 that comprise one or more volumes are typically organized as one or more groups of RAIDs. As an example, volume 230 comprises an aggregate of disk arrays 218 and 220, which comprise the cluster of disks 224 and 226.

In one embodiment, to facilitate access to disks 224, 226, 228, the operating system 208 may implement a file system (e.g., write anywhere file system) that logically organizes the information as a hierarchical structure of directories and files on the disks. In this embodiment, respective files may be implemented as a set of disk blocks configured to store information, whereas directories may be implemented as specially formatted files in which information about other files and directories are stored.

Whatever the underlying physical configuration within this data storage system 200, data can be stored as files within physical and/or virtual volumes, which can be associated with respective volume identifiers, such as file system identifiers (FSIDs), which can be 32-bits in length in one example.

A physical volume, which may also be referred to as a "traditional volume" in some contexts, corresponds to at least a portion of physical storage devices whose address, addressable space, location, etc. doesn't change, such as at least some of one or more data storage devices 234 (e.g., a Redundant Array of Independent (or Inexpensive) Disks (RAID system)). Typically the location of the physical volume doesn't change in that the (range of) address(es) used to access it generally remains constant.

A virtual volume, in contrast, is stored over an aggregate of disparate portions of different physical storage devices. The virtual volume may be a collection of different available portions of different physical storage device locations, such as some available space from each of the disks 224, 226, 228. It will be appreciated that since a virtual volume is not "tied" to any one particular storage device, a virtual volume can be said to include a layer of abstraction or virtualization, which allows it to be resized and/or flexible in some regards.

Further, a virtual volume can include one or more logical unit numbers (LUNs) 238, directories 236, qtrees 235, and files 240. Among other things, these features, but more particularly LUNS, allow the disparate memory locations within which data is stored to be identified, for example, and grouped as data storage unit. As such, the LUNs 238 may be characterized as constituting a virtual disk or drive upon which data within the virtual volume is stored within the aggregate. For example, LUNs are often referred to as virtual drives, such that they emulate a hard drive from a general purpose computer, while they actually comprise data blocks stored in various parts of a volume.

In one embodiment, one or more data storage devices 234 can have one or more physical ports, wherein each physical port can be assigned a target address (e.g., SCSI target address). To represent respective volumes stored on a data storage device, a target address on the data storage device can be used to identify one or more LUNs 238. Thus, for example, when the host 202 connects to a volume 230, 232 through the storage adapter 214, a connection between the host 202 and the one or more LUNs 238 underlying the volume is created.

In one embodiment, respective target addresses can identify multiple LUNs, such that a target address can represent multiple volumes. The I/O interface, which can be implemented as circuitry and/or software in the storage adapter 214 or as executable code residing in memory 206 and executed by the processors 204, for example, can connect to volume 230 by using one or more addresses that identify the LUNs 238.

It may be appreciated that a storage environment may be implemented within data storage system 200. For example, the storage environment may comprise storage device 234 (e.g., disks 224, 226, and/or 228) and/or other storage devices not illustrated. Node 202 may be implemented as a storage controller configured to store data and/or provide client 205 with access to data stored within the storage environment. For example, node 202 may comprise components configured to implement techniques for configuring the storage environment.

Figure 3:
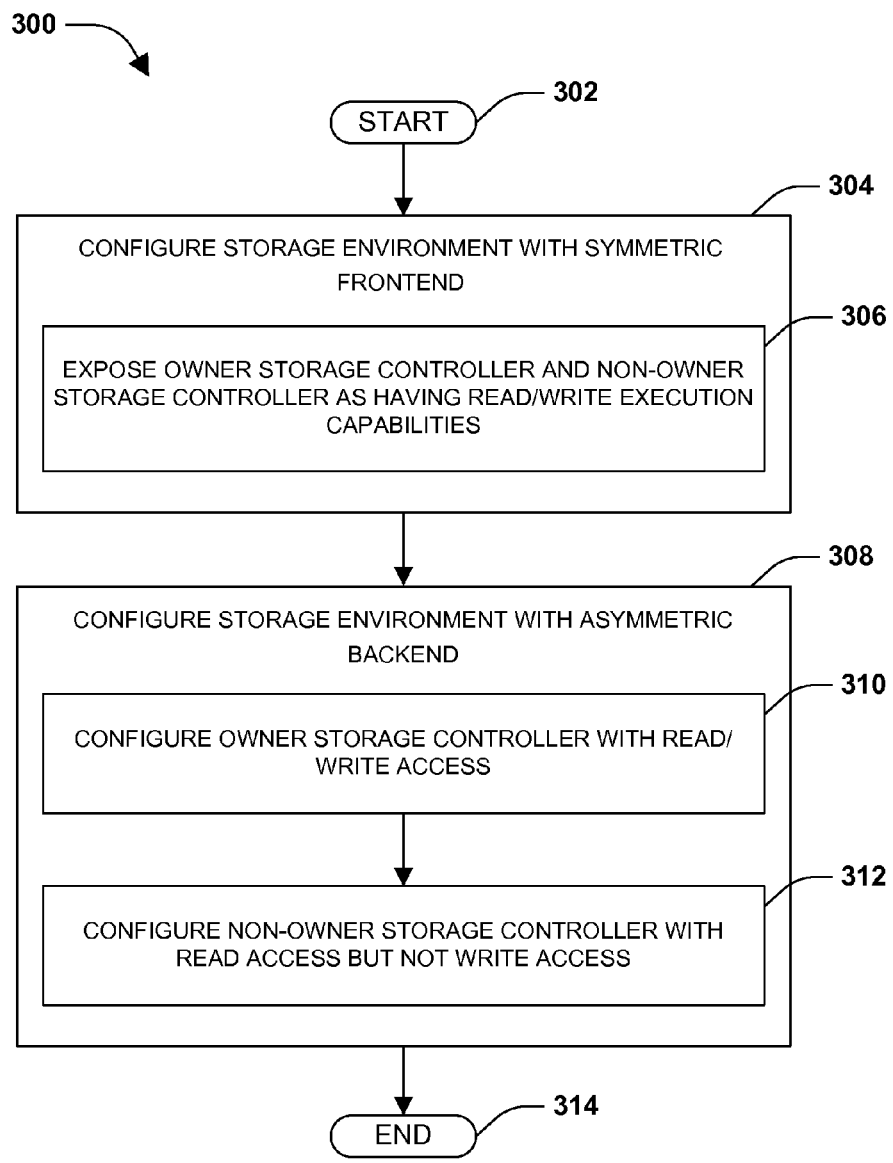
FIG. 3 is a flow chart illustrating an exemplary method of configuring a storage environment.
Figure 8:
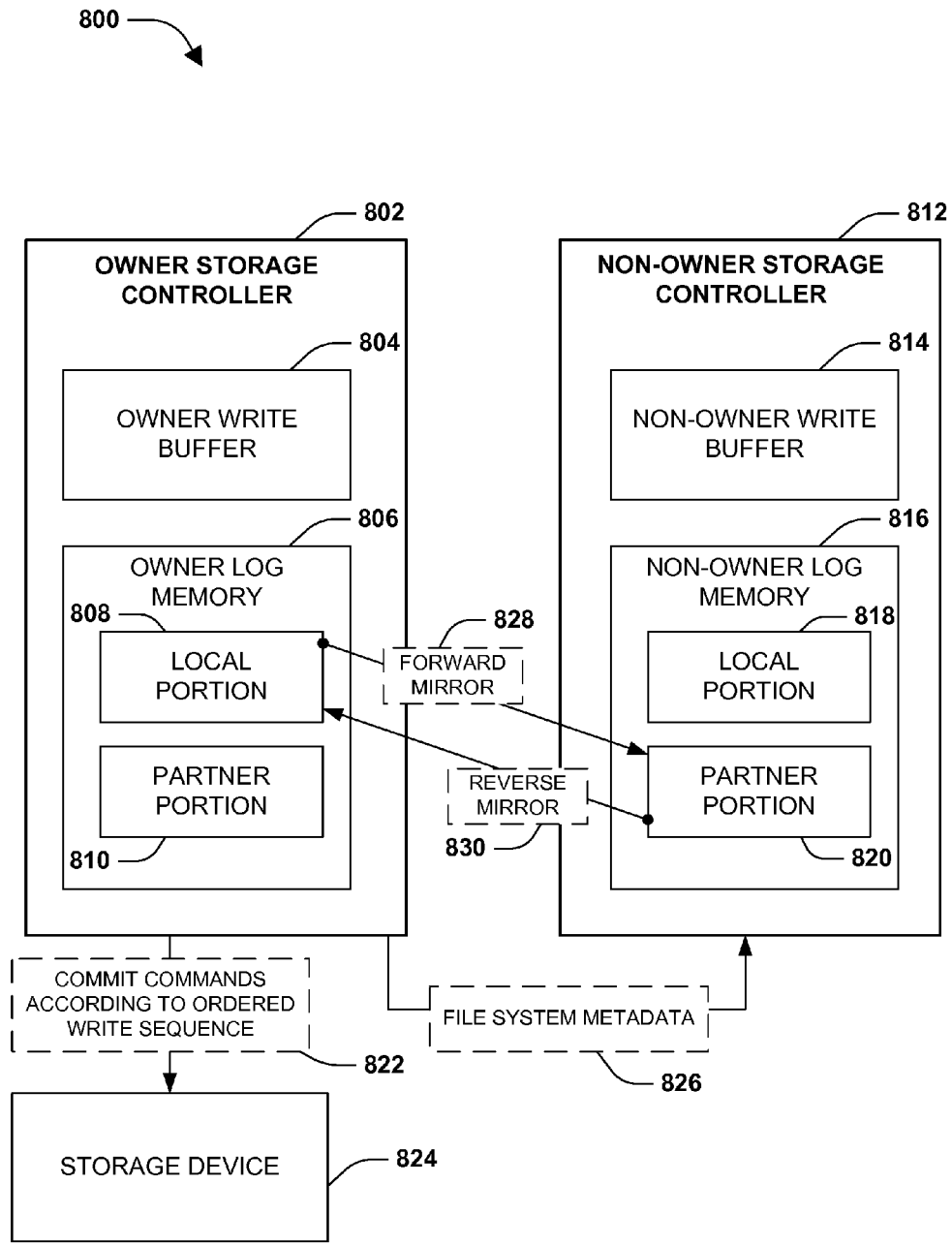
FIG. 8 is an illustration of an example of a storage environment comprising an owner storage controller, a non-owner storage controller, and a storage device owned by the owner storage controller.

One embodiment of configuring a storage environment comprising one or more storage controllers is illustrated by an exemplary method 300 in FIG. 3. At 302, the method starts. At 304, the storage environment may be configured with a symmetric frontend (e.g., an interface between a client and a storage controller, such as intermediate transportation components and/or protocol components, for example). That is, an owner storage controller and/or a non-owner storage controller may be exposed (e.g., to one or more clients) as having read/write execution capabilities associated with a storage device owned by the owner storage controller, but not owned by the non-owner storage controller, at 306. For example, clients may view target ports of the owner storage controller and the non-owner storage controller as having similar characteristics (e.g., data containers, such as a logical unit number (LUN), may appear as "local" on both the owner storage controller and the non-owner storage controller). In this way, a client may send an I/O request, such as a write command, to the owner storage controller and/or the non-owner storage controller for execution (e.g., the client may be unaware of an asymmetric backend configuration that may deny the non-owner storage controller permission to access the storage device owned by the owner storage controller). It may be appreciated that an example of an owner storage controller (e.g., owner storage controller 802) and a non-owner storage controller (e.g., non-owner storage controller 812) is illustrated in FIG. 8.

At 308, the storage environment may be configured with an asymmetric backend. That is, the owner storage controller may be configured with read/write access to the storage device, at 310. For example, the owner storage controller may be granted permission to execute a write command into an owner write buffer to create dirty data (e.g., modified data not yet committed to the storage device). The owner storage controller may be granted permission to log the write command (e.g., within an owner log memory, such as an owner NVRAM) for commitment of the dirty data to the storage device. Responsive to the owner storage controller executing and/or logging the write command, the owner storage controller may notify the non-owner storage controller of the write command. In this way, the non-owner storage controller may synchronize the dirty data into a non-owner write buffer (in the non-owner storage controller) (e.g., based upon file system metadata created from the commitment of the dirty data) and/or synchronize the logged write command into a non-owner log memory (in the non-owner storage controller). The owner storage controller may be granted permission to commit the dirty data within the owner write buffer to the storage device, and may instruct the non-owner storage controller to clean the non-owner write buffer based upon the commitment of the dirty data from the owner write buffer to the storage device (e.g., the non-owner storage controller may remove dirty data that may have been previously synchronized from the owner write buffer to the non-owner write buffer).

At 312, the non-owner storage controller may be configured with read access, but not write access, to the storage device. For example, the non-owner storage controller may be granted permission to execute a write command into a non-owner write buffer to create dirty data. However, the non-owner storage controller may be denied permission to log the write command for commitment of the dirty data to the storage device. For example, the non-owner storage controller may be denied permission to log the write command to a local portion of the non-owner log memory, but may be granted permission to log the write command into a partner portion of the non-owner log memory, which may be reverse mirrored (e.g., synchronized) with a local portion of an owner log memory so that the owner storage controller may commit the write command to the storage device from the local portion of the owner log memory. In one example of configuring the non-owner storage controller, a fence may be created between the non-owner storage controller and the storage device to prevent write access. The fence may comprise a mechanism and/or infrastructure configured to deny particular operations on a storage controller (e.g., a STONITH method and/or a resources fencing approach, such as persistent reservation fencing and/or global network block device fencing, for example). For example, the fence may forbid write operations on a storage controller to storage devices not owned by the storage controller.

In one example, the non-owner storage controller may receive a write command from a client. The non-owner storage controller may execute the write command into the non-owner write buffer to create dirty data. The non-owner storage controller may be denied permission to log the write command into the local portion of the non-owner log memory for commitment to the storage device. However, the non-owner storage controller may be permitted to log the write command into a partner portion of the non-owner log memory for synchronization with the owner storage controller. The owner storage controller may be notified of the executed write command, such that the owner storage controller may synchronize an owner write buffer with the dirty data within the non-owner write buffer. The owner storage controller may receive a notification to reverse mirror the logged write command from the partner portion of the non-owner log memory into a local portion of an owner log memory. The owner storage controller may commit the logged write command from the local portion of the owner log memory to the storage device. Similarly, the non-owner storage controller may be notified of the execution, logging, and/or commitment of write commands by the owner storage controller so that the non-owner storage controller may synchronize with the owner storage controller. In this way, the owner storage controller and the non-owner storage controller may be synchronized, such that the non-owner storage controller may efficiently take over control of the storage device in response to a failure of the owner storage controller. At 314, the method ends.

Figure 4:
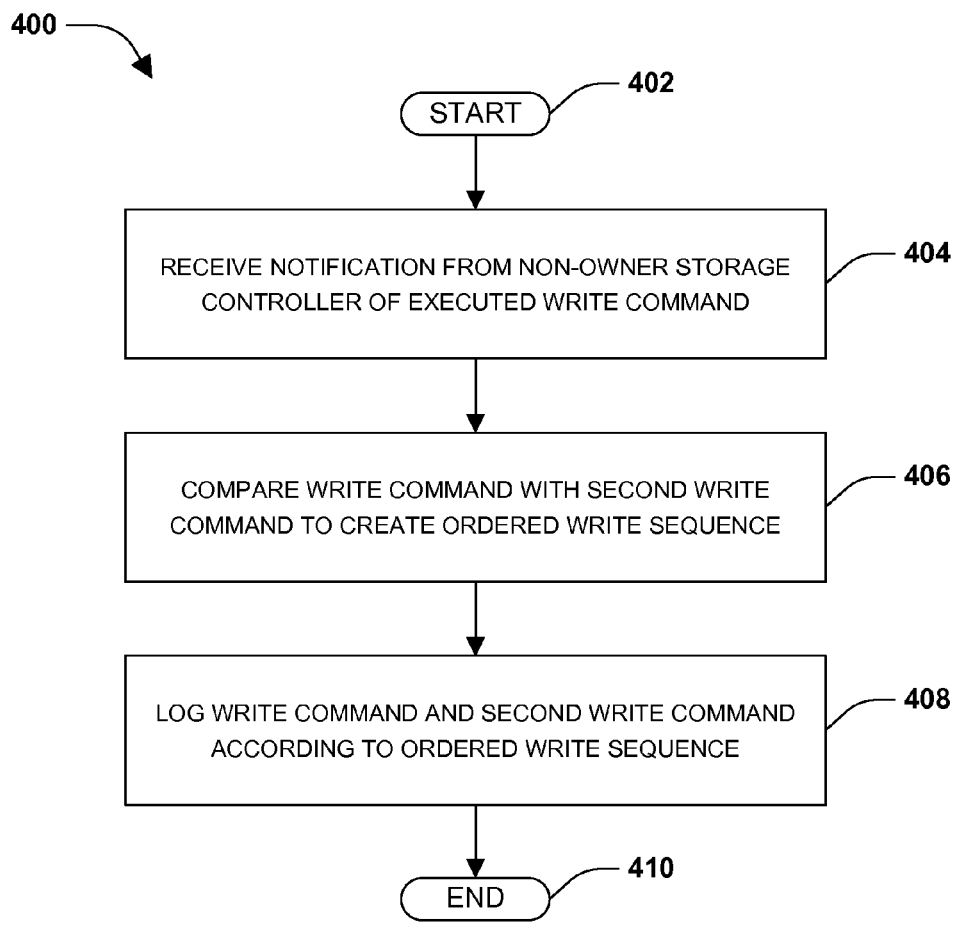
FIG. 4 is a flow chart illustrating an exemplary method of organizing write commands to synchronize a non-owner storage controller and an owner storage controller within a storage environment.

One embodiment of organizing write commands to synchronize a non-owner storage controller and an owner storage controller within a storage environment is illustrated by an exemplary method 400 in FIG. 4. At 402, the method starts. An owner storage controller may be configured to provide clients with access to a storage device owned by the owner storage controller (e.g., based upon a symmetric frontend configured within the storage environment). The owner storage controller may be granted permission to execute a write command (e.g., execute the write command into an owner write buffer to create dirty data), log the write command (e.g., within a local portion of an owner log memory), and/or commit dirty data to the storage device.

A non-owner storage controller may be configured to provide clients with access to the storage device that is not owned by the non-owner storage controller (e.g., based upon a symmetric frontend configured within the storage environment). In particular, the non-owner storage controller may be granted permission to execute a write command (e.g., execute the write command into a non-owner write buffer to create dirty data), but may be restricted from logging the write command and/or committing the dirty data to the storage controller (e.g., the non-owner storage controller may be restricted from logging the write command into a local portion of a non-owner log memory, but may be permitted to log the write command into a partner portion of the non-owner log memory for synchronization with the local portion of the owner log memory). It may be appreciated that an example of an owner storage controller (e.g., owner storage controller 802) and a non-owner storage controller (e.g., non-owner storage controller 812) is illustrated in FIG. 8.

Because the owner storage controller and/or the non-owner storage controller may receive write commands, execute write commands, and/or log write commands at various times, discrepancies may arise as to an order with which the owner storage controller is to log and/or commit the write commands to the storage device (e.g., timing discrepancies may arise due to the asymmetric backend). Accordingly, one or more write commands may be logged and/or committed by the owner storage controller based upon an ordered write sequence. In one example, the owner storage controller may receive a notification from the non-owner storage controller that the non-owner storage controller executed a write command into a non-owner write buffer to create dirty data within the non-owner write buffer, at 404. The non-owner storage controller may have been restricted from logging the write command (e.g., into the local portion of the non-owner log memory) for commitment to the storage device owned by the owner storage controller (e.g., however, the non-owner storage controller may be permitted to log the write command into the partner portion of the non-owner log memory for synchronization with the local portion of the owner log memory).

At 406, the owner storage controller may compare the write command with a second write command queued for commitment to the storage device to create an ordered write sequence. For example, the owner storage controller may compare temporal data associated with the write commands (e.g., timestamps specifying times at which the write commands were received by the storage controllers) to identify an order for the write commands. At 408, the owner storage controller may log the write command and/or the second write command (e.g., within the local portion of the owner log memory) for commitment to the storage device according to the ordered write sequence. The owner storage controller may notify the non-owner storage controller of the logged write command and/or the logged second write command (e.g., a first notice comprising a first sequence number, a first starting offset within the owner log memory, and/or a first size of the logged write command; a second notice comprising a second sequence number, a second starting offset within the owner log memory, and/or a second size of the logged second write command; etc.). In one example, the local portion of the owner log memory may be forward mirrored to the partner portion of the non-owner log memory based upon the logging. In another example, dirty data within the non-owner write buffer may be cleaned (e.g., removed) by the non-owner storage controller based upon a commitment of the write commands by the owner storage controller. In this way, the owner storage controller and the non-owner storage controller may be synchronized (e.g., the local portion of the owner log memory may be synchronized with the partner portion of the non-owner log memory and/or the non-owner write buffer may be synchronized with the owner write buffer).

In one example, the non-owner storage controller may have received the write command at a first time. The owner storage controller may have received the second write command at a second time after the first time. The non-owner storage controller may execute the write command, and the owner storage controller may execute the second write command asynchronously. Because the non-owner storage controller cannot log the write command for commitment, the non-owner storage controller may notify the owner storage controller of the executed write command. The owner storage controller may log the executed write command and the executed second write command accordingly to an ordered write sequence (e.g., to take into account timing discrepancies that may have occurred based upon variations in execution times, notification times, and/or other processing times). For example, the second write command may have been already logged by the owner storage controller before the write command. Accordingly, the owner storage controller may replay (e.g., log) the write command before the second write command based upon the ordered write sequence (e.g., based upon the second time being after the first time). At 410, the method ends.

Figure 5:
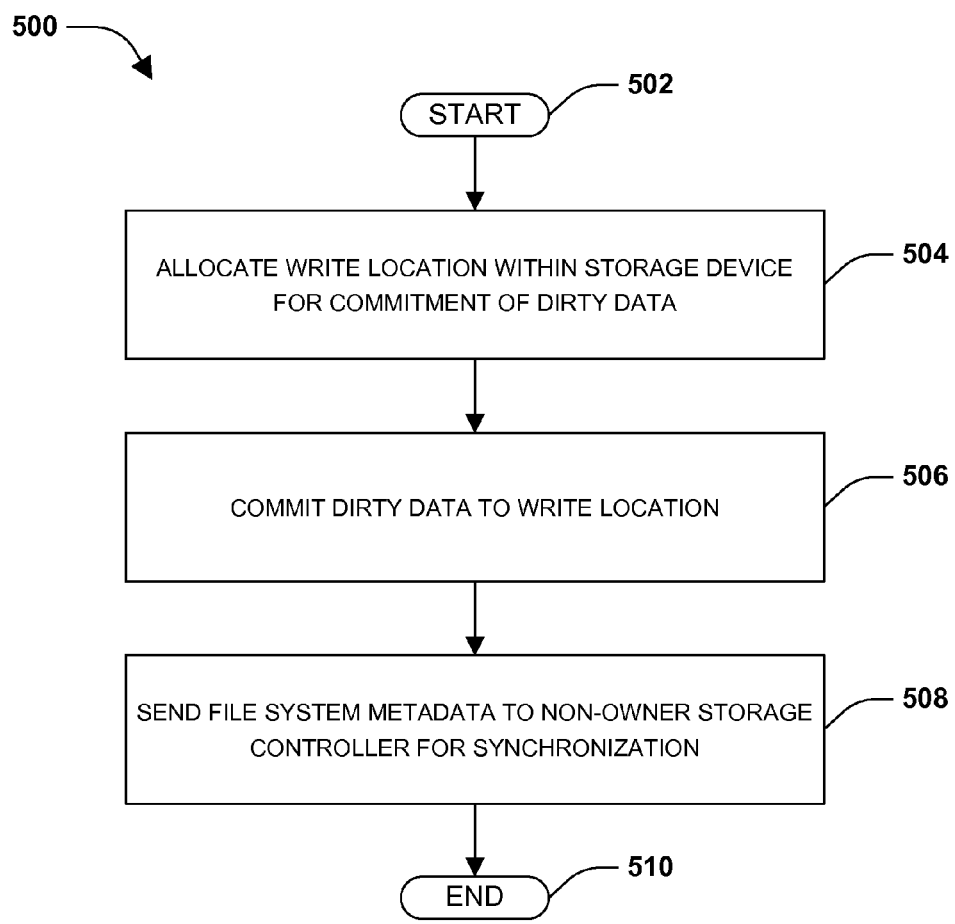
FIG. 5 is a flow chart illustrating an exemplary method of synchronizing file system metadata between an owner storage controller and a non-owner storage controller within a storage environment.

One embodiment of synchronizing file system metadata between an owner storage controller and a non-owner storage controller within a storage environment is illustrated by an exemplary method 500 in FIG. 5. At 502, the method starts. The owner storage controller may be configured to provide clients with access to a storage device owned by the owner storage controller (e.g., based upon a symmetric frontend configured within the storage environment). For example, the owner storage controller may execute a write command, log the write command, and/or commit dirty data to the storage device. Committing the dirty data to the storage device may result in file system metadata. For example, the file system metadata may be created by a file system associated with the storage device, and may comprise a virtual volume block number, a physical volume block number, an inode of a directory correspond to a write location of the dirty data on the storage device, and/or other information associated with the committed dirty data. It may be advantageous to synchronize the file system metadata with the non-owner storage controller, which may be used to clear out stale dirty data within a non-owner write buffer corresponding to the committed dirty data. That is, once dirty data is committed to the storage device, the committed dirty data within the write buffers becomes stale. Accordingly, the non-owner storage controller may clean stale dirty data within the non-owner write buffer based upon the file system metadata. It may be appreciated that an example of an owner storage controller (e.g., owner storage controller 802) and a non-owner storage controller (e.g., non-owner storage controller 812) is illustrated in FIG. 8.

In one example of synchronizing file system metadata, the owner storage controller may allocate a write location within the storage device owned by the owner storage controller for dirty data within the owner write buffer, at 504. The dirty data may correspond to a write command logged for commitment to the storage device by the owner storage controller (e.g., the owner storage controller may have executed the write command to create the dirty data within the owner write buffer and/or logged the write command within a local portion of an owner log memory). At 506, the owner storage controller may commit the dirty data to the write location within the storage device, resulting in file system metadata (e.g., a virtual volume block number, a physical volume block number, an inode, etc.). At 508, the owner storage controller may send the file system metadata to the non-owner storage controller for synchronization. For example, the non-owner storage controller may clean the non-owner write buffer (e.g., remove a synchronized copy of the dirty data) based upon an instruction from the owner storage controller. In this way, the owner storage controller and the non-owner storage controller may be synchronized. At 510, the method ends.

Figure 6:
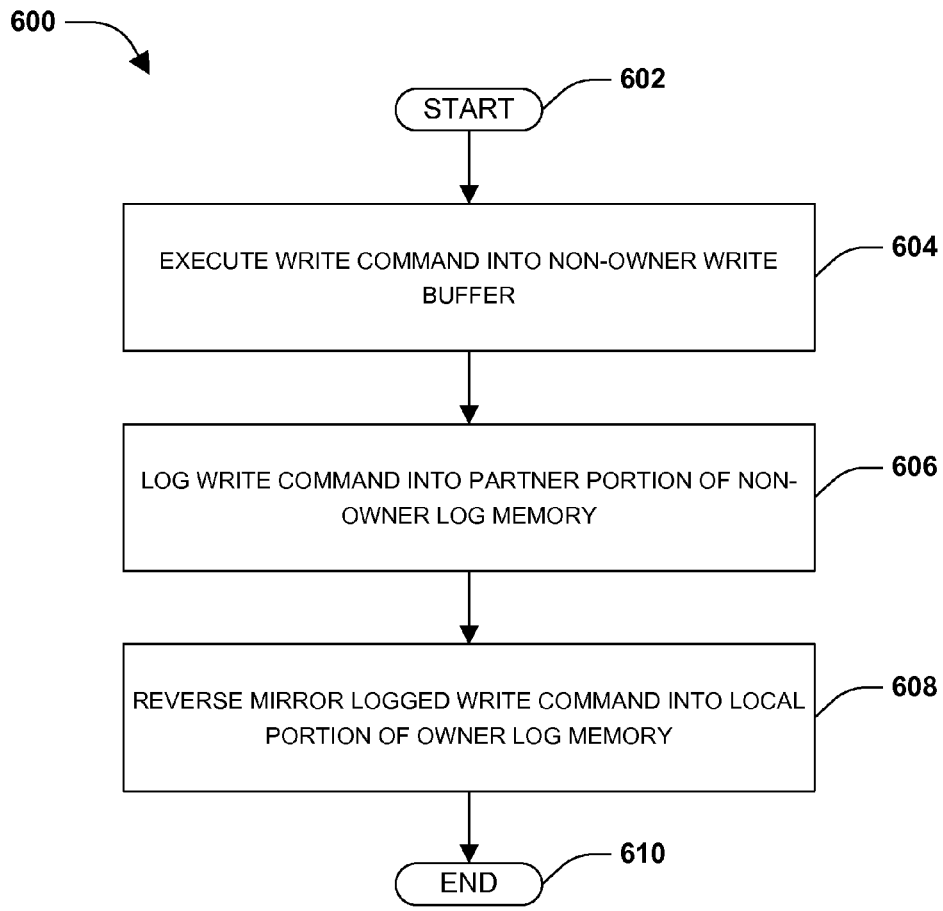
FIG. 6 is a flow chart illustrating an exemplary method of reverse mirroring log data between an owner log memory of an owner storage controller and a non-owner log memory of a non-owner storage controller within a storage environment.

One embodiment of reverse mirroring log data between an owner log memory of an owner storage controller and a non-owner log memory of a non-owner storage controller within a storage environment is illustrated by an exemplary method 600 in FIG. 6. At 602, the method starts. The owner storage controller may be configured to provide clients with access to a storage device owned by the owner storage controller (e.g., based upon a symmetric frontend configured within the storage environment). For example, the owner storage controller may execute a write command, log the write command, and/or commit dirty data to the storage device. The non-owner storage controller may be configured to execute a write command and/or log the write command into a partner portion of the non-owner log memory for reverse mirroring with a local portion of the owner log memory. However, the non-owner storage controller may be restricted from logging the write command into a local portion of the non-owner log memory for commitment to the storage device because the non-owner storage controller is not an owner of the storage controller (e.g., based upon an asymmetric backend configuration). It may be appreciated that an example of an owner storage controller (e.g., owner storage controller 802) and a non-owner storage controller (e.g., non-owner storage controller 812) is illustrated in FIG. 8.

In one example of reserve mirroring, the non-owner storage controller may receive a write command from a client. At 604, the non-owner storage controller may execute the write command into the non-owner write buffer to create dirty data within the non-owner write buffer. At 606, the non-owner storage controller may log the write command into the partner portion of the non-owner log memory. The non-owner storage controller may be restricted from logging the write command into the local portion of the non-owner log memory and/or committing the dirty data to the storage device.

At 608, the logged write command may be reverse mirrored from the partner portion of the non-owner log memory to the local portion of the owner log memory of the owner storage controller. In one example, the non-owner storage controller may notify the owner storage controller of an intent to reverse mirror the logged write comment. The non-owner storage controller may receive mirroring information comprising an offset and/or size reserved by the owner storage controller for reverse mirroring of the logged write command into the local portion of the owner log memory. In this way, the non-owner storage controller may reverse mirror the logged write command based upon the mirroring information. The mirrored logged write command may be available for the owner storage controller to commit to the storage device.

In one example of forward mirroring, the owner storage controller may receive a second write command. The owner storage controller may execute the second write command into the owner write buffer to create dirty data. The owner storage controller may log the second write command into the local portion of the owner log memory. The logged second write command may be forward mirrored into the partner portion of the non-owner log memory. In this way, the non-owner storage controller may be synchronized with the owner storage controller.

Synchronizing the owner storage controller and the non-owner storage controller (e.g., synchronizing write buffers, log memories, and/or file system metadata) may allow the non-owner storage controller to efficiently take over ownership of the storage device in response to a failure of the owner storage controller. For example, the non-owner storage controller may receive an I/O request corresponding to the storage device from a client. The non-owner storage controller may process the I/O request using the partner portion of the non-owner log memory. For example, the non-owner storage controller may satisfy the I/O request based upon data stored within the partner portion of the non-owner write buffer and/or data stored within the storage device. At 610, the method ends.

Figure 7:
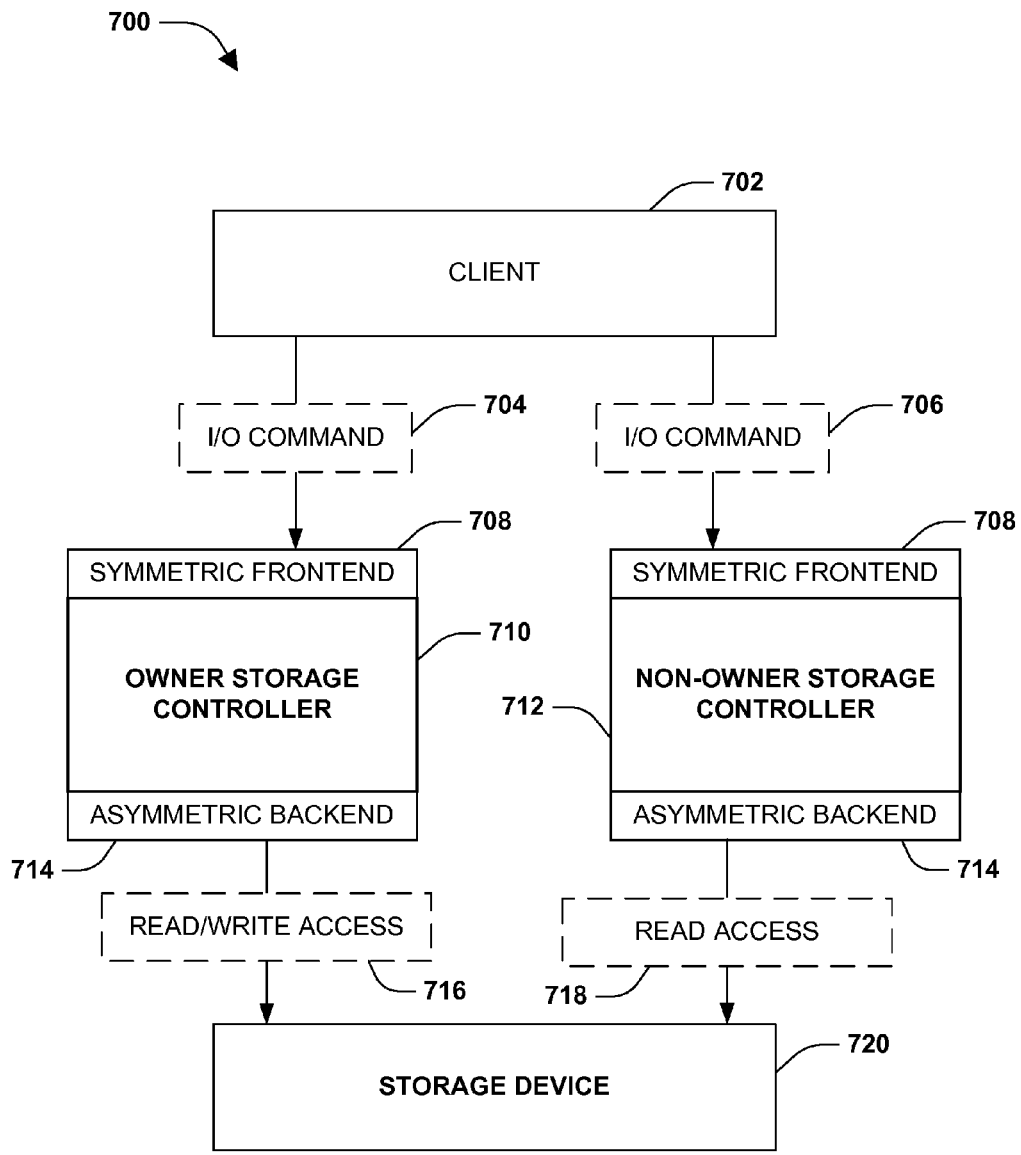
FIG. 7 is an illustration of an example of a storage environment comprising an owner storage controller, a non-owner storage controller, and a storage device owned by the owner storage controller.

FIG. 7 illustrates an example 700 of a storage environment comprising an owner storage controller 710, a non-owner storage controller 712, and a storage device 720 owned by the owner storage controller 710. The storage environment may be configured with a symmetric frontend 708. For example, the owner storage controller 710 and/or the non-owner storage controller 712 may be exposed through the symmetric frontend 708 to client 702 as having read/write execution capabilities associated with the storage device 720 owned by the owner storage controller 710. In this way, the owner storage controller 710 may receive an I/O command 704, such as a write command, from the client 702 for processing. The non-owner storage controller 712 may receive an I/O command 706, such as a write command, from the client 702 for processing.

The storage environment may be configured with an asymmetric backend 714. For example, the owner storage controller 710 may be configured with read/write access 716 to the storage device 720. In particular, the owner storage controller 710 may be granted permission to execute a write command, log the write command, and/or commit dirty data to the storage device 720. The non-owner storage controller may be configured with read access 718, but not write access, to the storage device 720. In particular, the non-owner storage controller 712 may be granted permission to execute a write command and/or log the write command into a partner portion of a non-owner log memory for synchronization (e.g., reverse mirroring) with a local portion of an owner log memory so that the owner storage controller 710 may commit the dirty data to the storage device 720. However, the non-owner storage controller 712 may be denied permission to log the write command into a local portion of the non-owner log memory for commitment to the storage device 720. The owner storage controller 710 and/or the non-owner storage controller 812 may be synchronized (e.g., write buffers, log memories, and/or file system metadata) to allow the non-owner storage controller 712 to efficiently take over ownership of the storage device 720 in response to a failure of the owner storage controller 710.

FIG. 8 illustrates an example 800 of a storage environment comprising an owner storage controller 802, a non-owner storage controller 812, and a storage device 824 owned by the owner storage controller 802. The owner storage controller 802 may comprise an owner write buffer 804. The owner storage controller 802 may be configured to execute a write command to create dirty data within the owner write buffer 804 (e.g., for later commitment to the storage device 824). In one example, the owner write buffer 804 may be synchronized with a non-owner write buffer 814 of the non-owner storage controller 812. The owner storage controller 802 may comprise an owner log memory 806. The owner log memory 806 may comprise a local portion 808 and/or a partner portion 810. The owner storage controller 802 may be configured to log a first write command executed by the owner storage controller 802 into the local portion 808 for commitment to the storage device 824. The owner storage controller 802 may forward mirror 828 the logged first write command from the local portion 808 into a partner portion 820 of a non-owner log memory 816 of the non-owner storage controller 812. In this way, the non-owner storage controller 812 may become aware of write commands executed, logged, and/or committed to the storage device 824.

The non-owner storage controller 812 may comprise the non-owner write buffer 814. The non-owner storage controller 812 may be configured to execute a second write command associated with the storage device 824 to create dirty data within the non-owner write buffer 814. In one example, the non-owner write buffer 814 may be synchronized with the owner write buffer 804 of the owner storage controller 802. The non-owner storage controller 812 may comprise the non-owner log memory 816. The non-owner log memory 816 may comprise a local portion 818 and/or the partner portion 820. The non-owner storage controller 812 may be restricted from logging the second write command into the local portion 818 of the non-owner log memory 816 because the non-owner storage controller 812 may not have permission to commit the second write command to the storage device 824 that the non-owner storage controller 812 does not own. However, the non-owner storage controller 812 may log the second write command into the partner portion 820 of the non-owner log memory 816. The non-owner storage controller 812 may reverse mirror 830 the logged second write command from the partner portion 820 of the non-owner log memory 816 to the local portion 808 of the owner log memory 806. In this way, the owner storage controller 802 may become aware of the second write command, and may commit the second write command to the storage device 824. In one example, the owner storage controller 802 may commit the first write command and the second write command according to an ordered write sequence 822. File system metadata 826 resulting from the commitment may be synchronized between the owner storage controller 802 and the non-owner storage controller 812.

Synchronizing the owner storage controller 802 and the non-owner storage controller 812 (e.g., synchronizing write buffers, log memories, and/or file system metadata) may allow the non-owner storage controller 812 to efficiently take over ownership of the storage device 824 in response to a failure of the owner storage controller 802. For example, the non-owner storage controller 812 may process I/O requests for the storage device 824 utilizing the partner portion 820 of the non-owner log memory 816, synchronized dirty data within the non-owner write buffer 814, and/or the storage device 824.

It will be appreciated that processes, architectures and/or procedures described herein can be implemented in hardware, firmware and/or software. It will also be appreciated that the provisions set forth herein may apply to any type of special-purpose computer (e.g., file host, storage server and/or storage serving appliance) and/or general-purpose computer, including a standalone computer or portion thereof, embodied as or including a storage system. Moreover, the teachings herein can be configured to a variety of storage system architectures including, but not limited to, a network-attached storage environment and/or a storage area network and disk assembly directly attached to a client or host computer. Storage system should therefore be taken broadly to include such arrangements in addition to any subsystems configured to perform a storage function and associated with other equipment or systems.

In some embodiments, methods described and/or illustrated in this disclosure may be realized in whole or in part on computer-readable media. Computer readable media can include processor-executable instructions configured to implement one or more of the methods presented herein, and may include any mechanism for storing this data that can be thereafter read by a computer system. Examples of computer readable media include (hard) drives (e.g., accessible via network attached storage (NAS)), Storage Area Networks (SAN), volatile and non-volatile memory, such as read-only memory (ROM), random-access memory (RAM), EEPROM and/or flash memory, CD-ROMs, CD-Rs, CD-RWs, DVDs, cassettes, magnetic tape, magnetic disk storage, optical or non-optical data storage devices and/or any other medium which can be used to store data.

Figure 9:
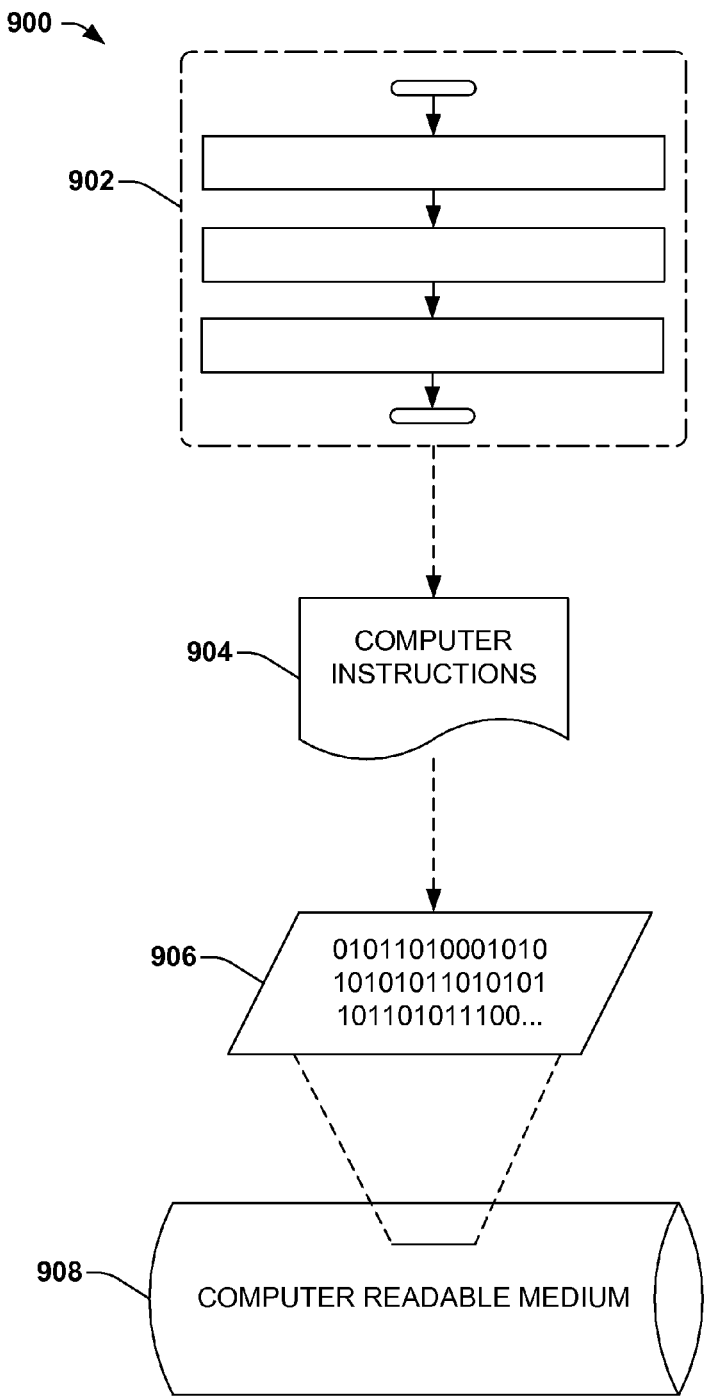
FIG. 9 is an example of a computer readable medium in accordance with one or more of the provisions set forth herein.

Another embodiment (which may include one or more of the variations described above) involves a computer-readable medium comprising processor-executable instructions configured to apply one or more of the techniques presented herein. An exemplary computer-readable medium that may be devised in these ways is illustrated in FIG. 9, where the implementation 900 comprises a computer-readable medium 908 (e.g., a CD-R, DVD-R, platter of a hard disk drive, flash drive, etc.), on which is encoded computer-readable data 906. This computer-readable data 906 in turn comprises a set of computer instructions 904 configured to operate according to the principles set forth herein. In one such embodiment, the processor-executable instructions 904 may be configured to perform a method 902, such as at least some of the method 300 of FIG. 3, at least some of method 400 of FIG. 4, at least some of method 5 of FIG. 5, and/or at least some of method 6 of FIG. 6, for example, and/or at least some of a system, such as at least some of the system 700 of FIG. 7 and/or at least some of system 800 of FIG. 8, for example. Many such computer-readable media may be devised by those of ordinary skill in the art that are configured to operate in accordance with the techniques presented herein.

Although the disclosure has been shown and described with respect to one or more implementations, equivalent alterations and modifications will occur to others skilled in the art based upon a reading and understanding of this specification and the annexed drawings. The disclosure is intended to include such modifications and alterations. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure which performs the function in the herein illustrated exemplary implementations of the disclosure. Furthermore, to the extent that the terms "includes", "having", "has", "with", or variants thereof are used in either the detailed description or the claims, such terms are intended to be inclusive in a manner similar to the term "comprising." Also, "exemplary" means an example, not the best; "or" is intended to be inclusive not exclusive; "a" and/or "an" mean "one or more" unless specified otherwise and/or clear from context to be directed to a singular form; and at least one of A and B and/or the like generally means A or B or both A and B.

What is claimed is:

1. A method for organizing write commands to synchronize a non-owner storage controller and an owner storage controller within a storage environment, comprising:

receiving, at an owner storage controller, a notification from a non-owner storage controller that the non-owner storage controller executed a write command into a non-owner write buffer to create dirty data within the non-owner write buffer, the write command not logged, by the non-owner storage controller, for commitment to a storage device owned by the owner storage controller;

comparing, by the owner storage controller, the write command with a second write command queued for commitment to the storage device to create an ordered write sequence; and logging, by the owner storage controller, the write command and the second write command for commitment to the storage device according to the ordered write sequence.

2. The method of claim 1, the logging resulting in a logged write command and a logged second write command, and the method comprising:

notifying the non-owner storage controller of the logged write command and the logged second write command.

3. The method of claim 1, the second write command executed by the owner storage controller to create dirty data within an owner write buffer.

4. The method of claim 1, the logging comprising:

synchronizing the dirty data within the non-owner write buffer with an owner write buffer.

5. The method of claim 1, the second write command previously logged within an owner log memory, the logging comprising replaying the write command before the second write command, the replaying comprising:

logging the write command before logging the second write command within the owner log memory.

6. The method of claim 2, the notifying comprising:

sending a first notice to the non-owner storage controller, the first notice comprising at least one of a first sequence number of the logged write command, a first starting offset of the logged write command within an owner log memory, or a first size of the logged write command within the owner log memory.

7. The method of claim 2, the notifying comprising:

sending a second notice to the non-owner storage controller, the second notice comprising at least one of a second sequence number of the logged second write command, a second starting offset of the logged second write command within an owner log memory, or a second size of the logged second write command within the owner log memory.

8. A system for organizing write commands to synchronize a non-owner storage controller and an owner storage controller within a storage environment, comprising:

an owner storage controller configured to:

receive a notification from a non-owner storage controller that the non-owner storage controller executed a write command into a non-owner write buffer to create dirty data within the non-owner write buffer, the write command not logged, by the non-owner storage controller, for commitment to a storage device owned by the owner storage controller;

identify a second write command queued for commitment to the storage device; and log the write command and the second write command for commitment to the storage device.

9. The system of claim 8, the owner storage controller configured to:

compare the write command with the second write command to create an ordered write sequence for logging the write command and the second write command.

10. The system of claim 8, the logging resulting in a logged write command and a logged second write command, and the owner storage controller configured to:

notify the non-owner storage controller of the logged write command and the logged second write command.

11. The system of claim 8, the owner storage controller configured to:

execute the second write command to create dirty data within an owner write buffer.

12. The system of claim 8, the second write command previously logged within an owner log memory, and the owner storage controller configured to:

replay the write command before the second write command; and log the write command before logging the second write command within the owner log memory.

13. The system of claim 9, the owner storage controller configured to:

log the write command and the second write command for commitment to the storage device according to the ordered write sequence.

14. The system of claim 10, the owner storage controller configured to:

send a first notice to the non-owner storage controller, the first notice comprising at least one of a first sequence number of the logged write command, a first starting offset of the logged write command within an owner log memory, or a first size of the logged write command within the owner log memory.

15. The system of claim 10, the owner storage controller configured to:

send a second notice to the non-owner storage controller, the second notice comprising at least one of a second sequence number of the logged second write command, a second starting offset of the logged second write command within an owner log memory, or a second size of the logged second write command within the owner log memory.

16. A non-transient computer readable medium comprising instructions which when executed at least in part via a processor perform a method for organizing write commands to synchronize a non-owner storage controller and an owner storage controller within a storage environment, comprising:

receiving, at an owner storage controller, a notification from a non-owner storage controller that the non-owner storage controller executed a write command, the write command not logged, by the non-owner storage controller, for commitment to a storage device owned by the owner storage controller;

comparing, by the owner storage controller, the write command with a second write command queued for commitment to the storage device to create an ordered write sequence; and logging, by the owner storage controller, the write command and the second write command for commitment to the storage device according to the ordered write sequence.

17. The non-transient computer readable medium of claim 16, the write command executed into a non-owner write buffer to create dirty data within the non-owner write buffer.

18. The non-transient computer readable medium of claim 16, the logging resulting in a logged write command and a logged second write command, and the method comprising:

notifying the non-owner storage controller of the logged write command and the logged second write command.

19. The non-transient computer readable medium of claim 16, the second write command executed by the owner storage controller to create dirty data within an owner write buffer.

20. The non-transient computer readable medium of claim 17, the logging comprising:
synchronizing the dirty data within the non-owner write buffer with an owner write buffer.

21. The non-transient computer readable medium of claim 18, the notifying comprising:
sending a first notice to the non-owner storage controller, the first notice comprising at least one of a first sequence number of the logged write command, a first starting offset of the logged write command within an owner log memory, or a first size of the logged write command within the owner log memory.

* * * * *